(12) United States Patent
Franceschini et al.

(10) Patent No.: US 9,981,702 B2
(45) Date of Patent: May 29, 2018

(54) MOTOR VEHICLE STRUCTURE HAVING A HOLDING ELEMENT FOR HOLDING A SPARE WHEEL OR OTHER COMPONENT ON A FLOOR PORTION MADE OF PLASTIC MATERIAL

(71) Applicant: C.R.F. Società Consortile per Azioni, Orbassano (Turin) (IT)

(72) Inventors: Daniele Franceschini, Giaveno (IT); Giovanni Monfrino, San Germano Chisone (IT); Roberto Puppini, Nichelino (IT)

(73) Assignee: C.R.F. SOCIETA CONSORTILE PER AZIONI, Orbassano (Turin) (IT)

( * ) Notice: Subject to any disclaimer, the term of this patent is extended or adjusted under 35 U.S.C. 154(b) by 0 days. days.

(21) Appl. No.: 15/188,042

(22) Filed: Jun. 21, 2016

(65) Prior Publication Data
US 2016/0368547 A1    Dec. 22, 2016

(30) Foreign Application Priority Data
Jun. 22, 2015 (EP) .................................... 15173128

(51) Int. Cl.
*B62D 43/00* (2006.01)
*B62D 43/10* (2006.01)
(Continued)

(52) U.S. Cl.
CPC ................ *B62D 43/10* (2013.01); *B60R 5/00* (2013.01); *B62D 29/041* (2013.01)

(58) Field of Classification Search
CPC ...... B62D 43/02; B62D 43/045; B62D 43/04; B62C 43/04; B60R 9/06; B60R 9/10;
(Continued)

(56) References Cited

U.S. PATENT DOCUMENTS 4,598,848 A * 7/1986 Clark .................... B62D 43/08
                                                      224/42.12
4,687,124 A * 8/1987 Mahr ..................... B62D 43/10
                                                      224/42.24
(Continued)

FOREIGN PATENT DOCUMENTS

DE    10 2004 042 885 A1    4/2006
DE    10 2007 044 428 A1    3/2009
(Continued)

OTHER PUBLICATIONS

European Search Report dated Dec. 23, 2015, completed on Dec. 14, 2015, for corresponding EP Application No. 15173128.8.

*Primary Examiner* — Kiran B Patel
(74) *Attorney, Agent, or Firm* — Heslin Rothenberg Farley & Mesiti P.C.; Victor Cardona

(57) ABSTRACT

A motor-vehicle structure includes an underbody portion of sheet-metal defining an aperture with within there is mounted a floor portion of plastic material or composite material, for housing a spare wheel or other component of a vehicle, such as an electric or electronic component and/or for example a unit for accumulating electric energy. To said floor portion of plastic material or composite material there is associated a holding element having at least a first part anchored to the underbody portion of sheet-metal and at least a second part which can be anchored to said spare wheel or said other component, so that in case of an accident, said holding element prevents said spare wheel or said other component from being projected far away from the underbody structure, by constraining it instead to remain within a distance corresponding to one dimension of said holding element.

5 Claims, 8 Drawing Sheets

Figure 1:
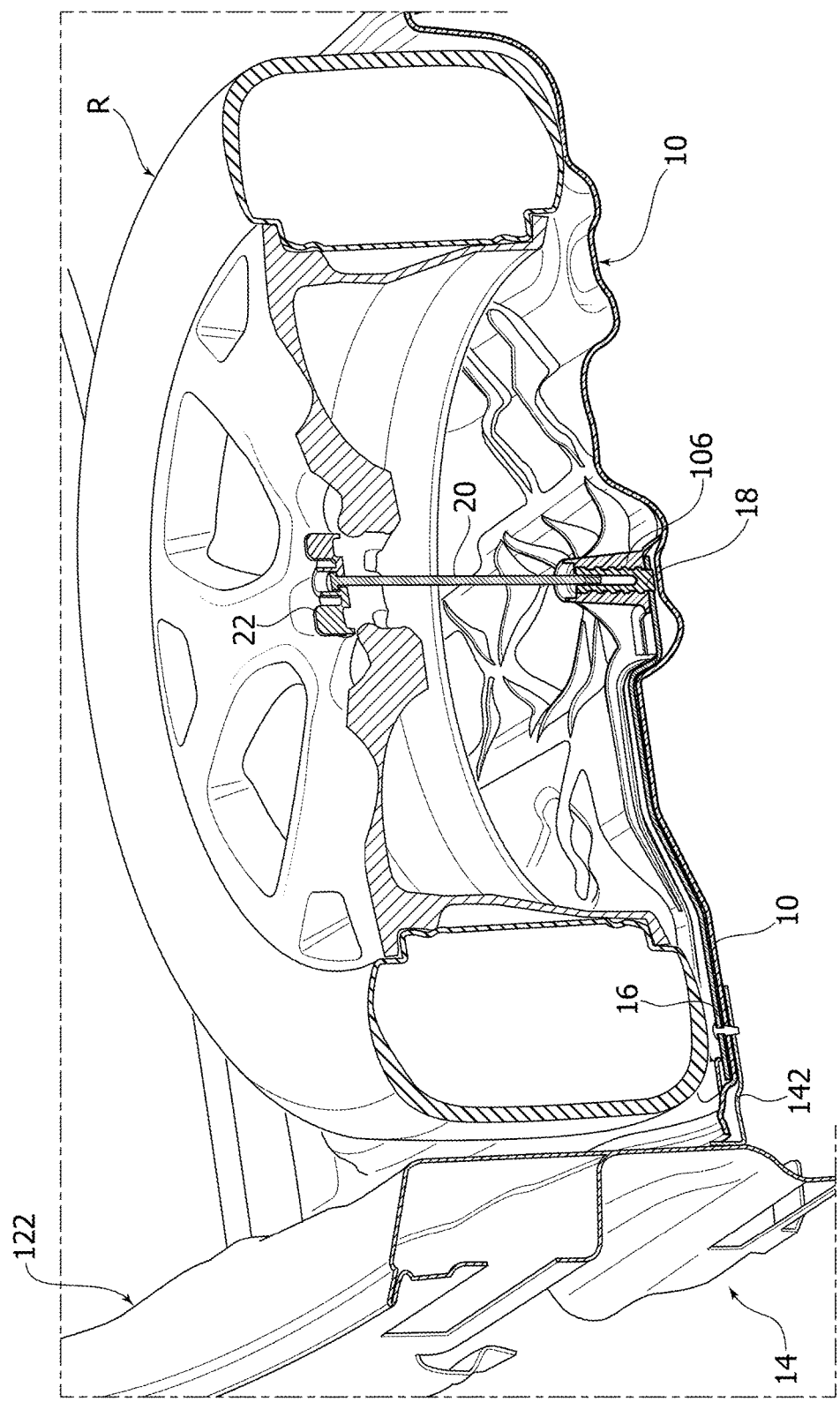

(51) Int. Cl.
 *B60R 5/00* (2006.01)
 *B62D 29/04* (2006.01)

(58) Field of Classification Search
 CPC ........ H01L 2924/0002; H01L 2924/00; C10M 2205/006; C10M 2205/0213; C10M 2205/024
 USPC .......................................................... 296/37.2
 See application file for complete search history.

(56) References Cited

U.S. PATENT DOCUMENTS

| | | | | |
|---|---|---|---|---|
| 4,830,241 | A * | 5/1989 | Ulmer | B62D 43/10 224/42.2 |
| 5,586,698 | A * | 12/1996 | Satoh | B62D 43/10 224/42.12 |
| 5,799,845 | A * | 9/1998 | Matsushita | B60R 5/04 224/42.14 |
| 5,860,687 | A * | 1/1999 | Corporon | B62D 25/087 224/42.12 |
| 5,979,962 | A * | 11/1999 | Valentin | B60R 13/01 296/37.1 |
| 6,029,876 | A * | 2/2000 | Spencer | B60K 15/06 141/2 |
| 6,082,803 | A * | 7/2000 | Klueger | B62D 43/10 224/42.24 |
| 6,290,278 | B1 * | 9/2001 | Loveland | B60R 5/04 296/37.3 |
| 6,336,671 | B1 * | 1/2002 | Leonardi | B60R 5/04 224/42.13 |
| 6,386,611 | B1 * | 5/2002 | Buchfink | B60R 11/02 296/187.08 |
| 6,389,670 | B2 * | 5/2002 | Morin | B62D 43/00 224/42.21 |
| 6,416,107 | B1 * | 7/2002 | Kanaguchi | B60N 2/3011 296/37.3 |
| 6,547,300 | B2 * | 4/2003 | Watanabe | B62D 21/152 224/42.12 |
| 7,011,352 | B2 * | 3/2006 | Matsuoka | B60R 7/04 296/37.14 |
| 7,036,860 | B1 * | 5/2006 | McGuckin | B62D 43/10 296/193.07 |
| 7,195,298 | B2 * | 3/2007 | Muthigi | B62D 43/10 296/187.08 |
| 7,410,081 | B2 * | 8/2008 | McClure | B62D 43/10 224/403 |
| 7,540,559 | B2 * | 6/2009 | Egawa | B62D 25/087 296/187.11 |
| 7,900,989 | B2 * | 3/2011 | Edwards | B60R 11/00 224/42.12 |
| 8,371,485 | B2 * | 2/2013 | Rosenplanter | B62D 43/002 224/42.13 |
| 8,579,167 | B2 * | 11/2013 | Yamada | B62D 43/04 224/42.12 |
| 8,622,161 | B2 * | 1/2014 | Hara | B62D 43/10 180/65.31 |
| 8,919,621 | B2 * | 12/2014 | O'Brien | B62D 43/005 224/42.2 |
| 9,227,669 | B2 * | 1/2016 | Shigihara | B62D 25/087 |
| 9,487,136 | B2 * | 11/2016 | Salter | B60Q 3/30 |
| 9,493,113 | B2 * | 11/2016 | Salter | B60Q 3/68 |
| 9,539,957 | B2 * | 1/2017 | Engerman | B60R 11/06 |
| 9,598,123 | B1 * | 3/2017 | Tavakoli-Targhi | B62D 43/10 |
| 2002/0050500 | A1 * | 5/2002 | Vasseur | B62D 43/08 224/42.21 |
| 2002/0053810 | A1 * | 5/2002 | Kaluszka | B62D 43/10 296/37.3 |
| 2002/0185881 | A1 * | 12/2002 | Kosuge | B60P 3/055 296/24.35 |
| 2003/0102687 | A1 * | 6/2003 | McLeod | B29C 70/467 296/37.2 |
| 2004/0105744 | A1 * | 6/2004 | Warner | B60R 5/04 414/522 |
| 2010/0225135 | A1 * | 9/2010 | Taneda | B62D 21/152 296/37.2 |
| 2011/0133504 | A1 * | 6/2011 | Takenaka | B60R 11/06 296/37.2 |
| 2011/0227367 | A1 * | 9/2011 | Funakoshi | B62D 25/087 296/187.11 |
| 2016/0090046 | A1 * | 3/2016 | Engerman | B60R 5/044 296/37.2 |

FOREIGN PATENT DOCUMENTS

| | | |
|---|---|---|
| DE | 10 2007 041382 A1 | 3/2009 |
| EP | 1 603 791 B1 | 1/2007 |
| JP | 2010-058561 A | 3/2010 |
| WO | 2008/152307 A2 | 12/2008 |

* cited by examiner

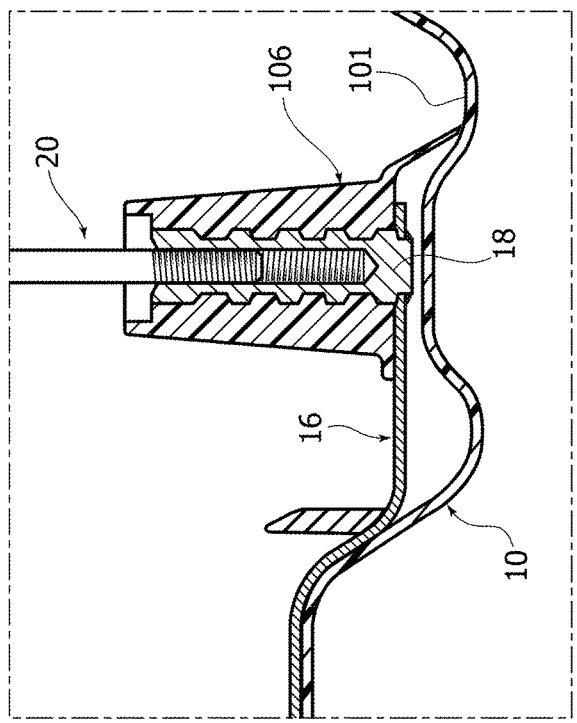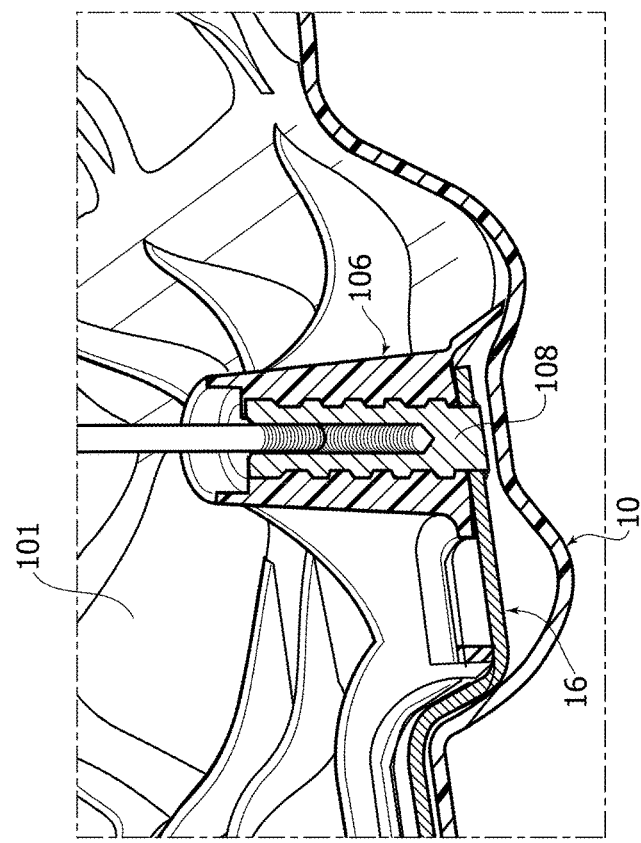

MOTOR VEHICLE STRUCTURE HAVING A HOLDING ELEMENT FOR HOLDING A SPARE WHEEL OR OTHER COMPONENT ON A FLOOR PORTION MADE OF PLASTIC MATERIAL

CROSS-REFERENCE TO RELATED APPLICATIONS

This application claims priority to European Patent Application No. 15173128.8 filed on Jun. 22, 2015, the entire disclosure of which is incorporated herein by reference.

FIELD OF THE INVENTION

The present invention relates to a motor-vehicle structure of the type including an underbody portion of sheet-metal defining an aperture within which a floor portion of plastic material or composite material is mounted, for housing a spare wheel or other component of the vehicle, such as an electric or electronic component, or for instance a so-called ESS unit (Energy Saving System) for accumulating electric energy.

In recent times structures for housing a spare wheel of a motor-vehicle have been proposed, comprising a floor portion made of plastic material reinforced with stiffening metal elements. A structure of this type is for example known from document DE 10 2007 044 428 A1. Similar solutions have been disclosed in documents WO 2008/152307 A2 and EP 1 603 791 B1.

Due to the use of a floor portion made of plastic material or composite material, it is possible to obtain even very complicated shapes in an economically efficient way, which shapes would be instead difficult or even impossible to obtain by using sheets of steel or light alloy. However, the use of this type of structure poses a problem with regard to safety requirements, also with reference to assurance that the component which is housed on the floor portion remains anchored to the motor-vehicle structure even under extreme conditions, such as in case of an accident.

OBJECT OF THE INVENTION

The object of the present invention is that of proposing a simple, economic and efficient solution to the above indicated problem.

SUMMARY OF THE INVENTION

In view of achieving this object, the invention provides a motor-vehicle structure having all the features of claim 1.

Due to the above indicated feature, the motor-vehicle structure according to the invention ensures a high degree of safety against any damages caused by the component housed on the floor portion made of plastic material in case of accidents in which the vehicle is involved. Indeed, even in the case that the component becomes separated from its housing structure, it cannot be projected far away from the vehicle structure to which the holding element is anchored directly, except only by a short distance, corresponding to the length of the holding element. This feature represents an important and advantageous difference of the present invention with respect to the known art. For example, in the case of a solution shown in document DE 10 2007 044 428 A1 which has been cited above, the housing structure, made of plastic material, is provided with a stiffening metal strip which however is secured only to the body of the housing structure, without being anchored directly also to the motor-vehicle structure. Therefore, in this known solution, in case of an accident, there is nothing which ensures a direct connection of the reinforcing element with the vehicle structure.

In general, the holding element according to the invention can be made of any material chosen among sheet-metal, plastic material or fibre-reinforced composite material. The holding element has at least one portion thereof anchored to the motor-vehicle structure by means of a connecting element which engages the motor-vehicle structure and at least a further part rigidly connected to an element for connection to the spare wheel or said other component.

DESCRIPTION OF PREFERRED EMBODIMENTS

Figure 2:
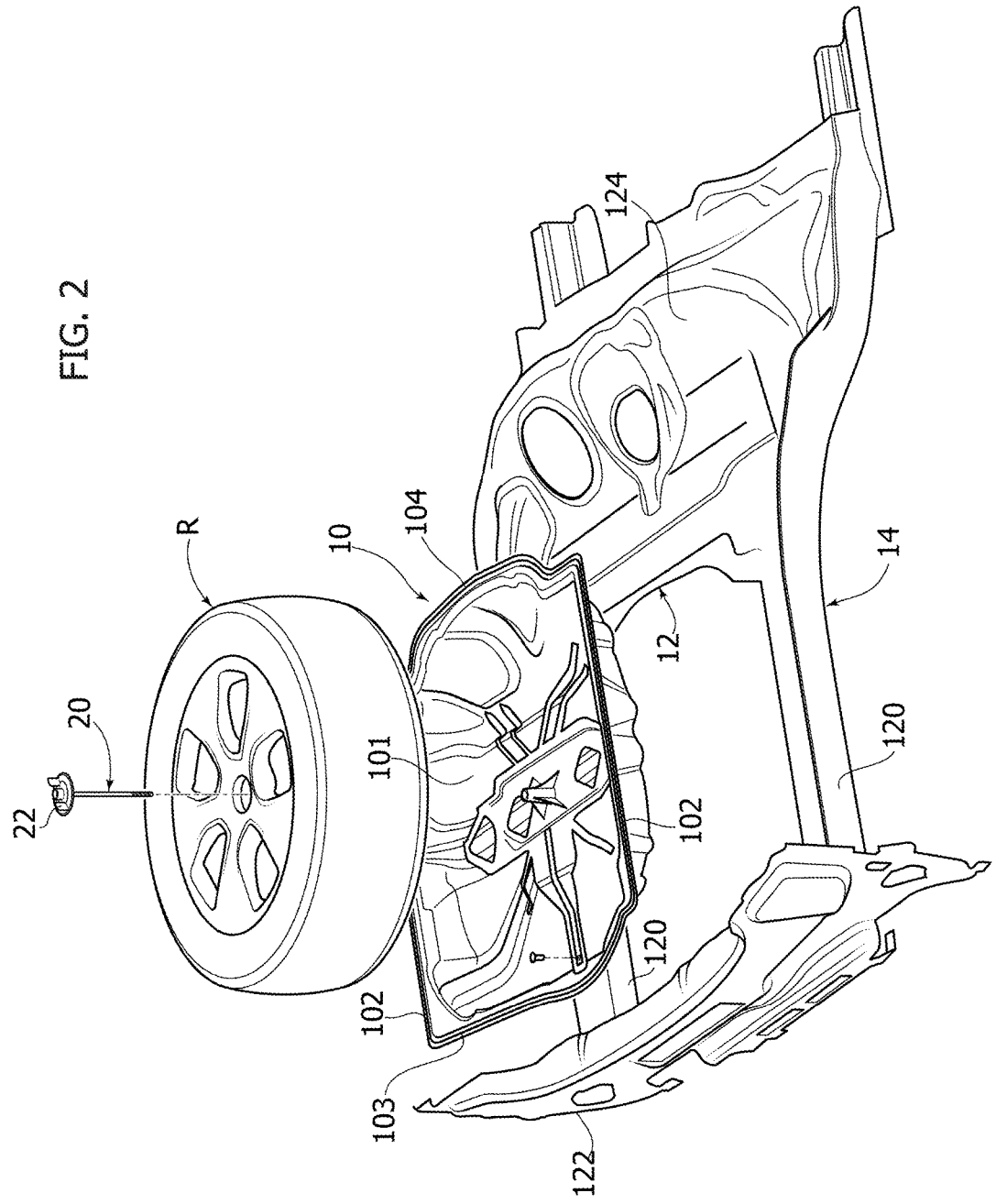
Figure 3:
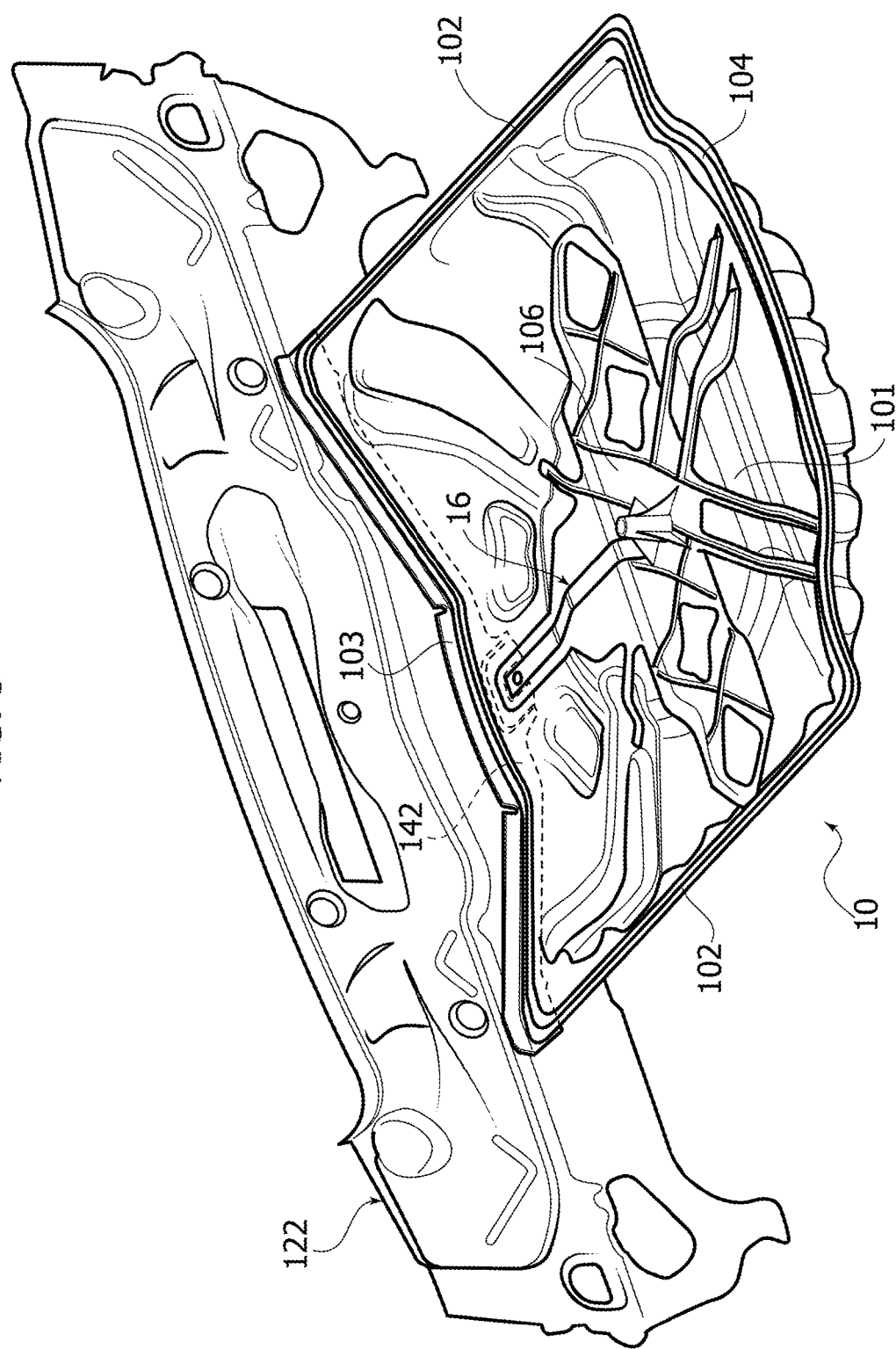
Figure 4:
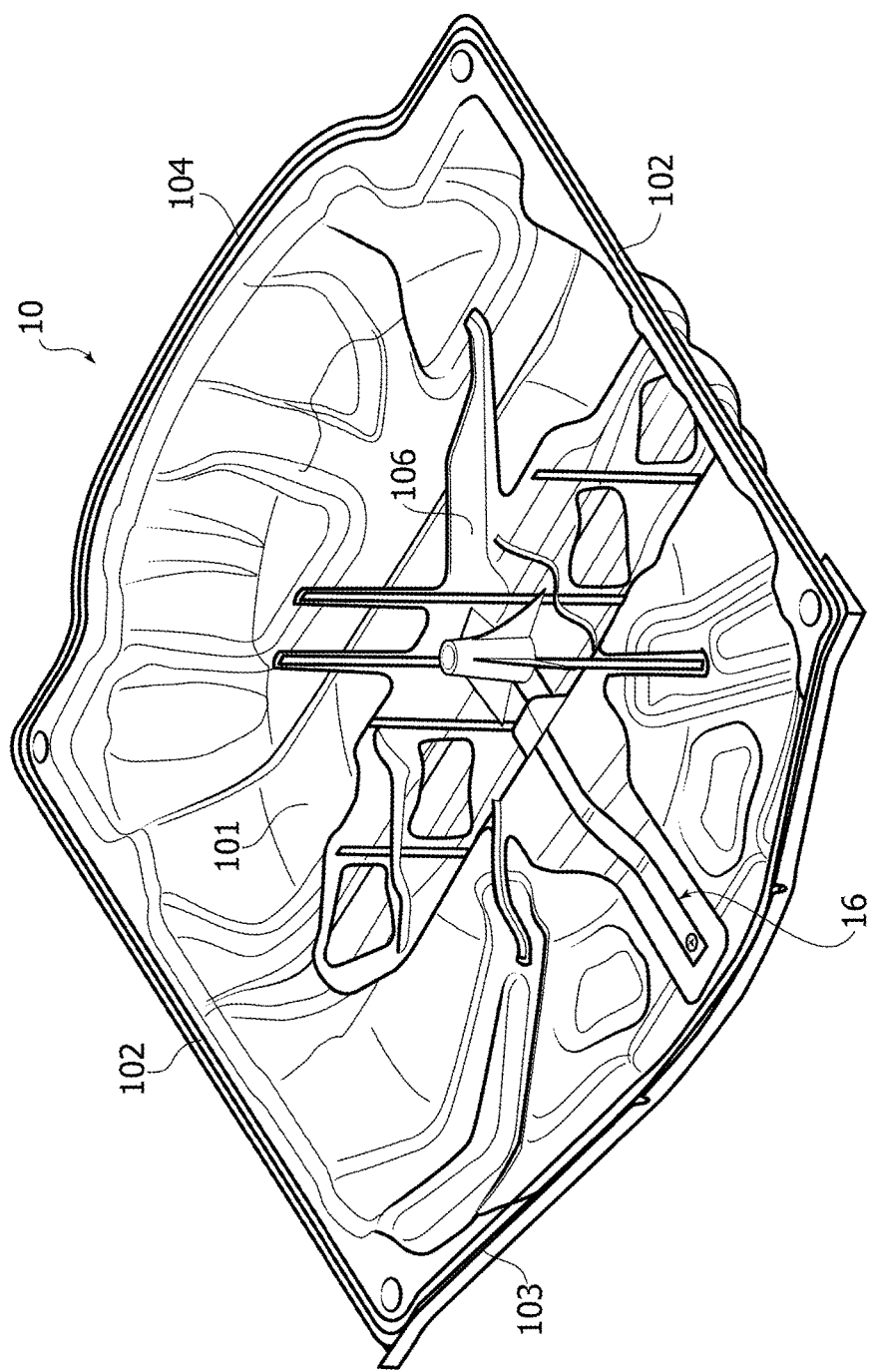
Figure 9:
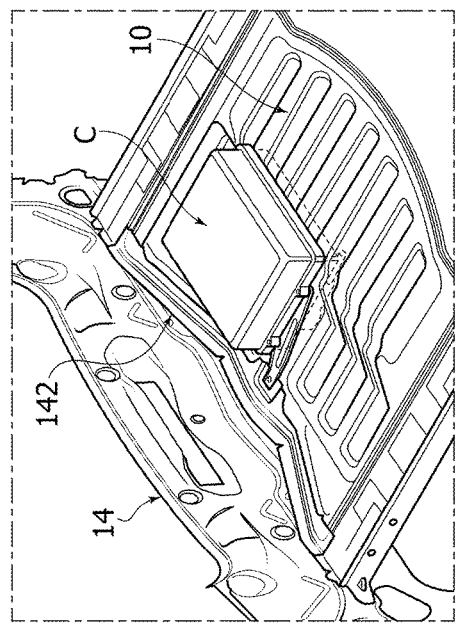
Figure 10:
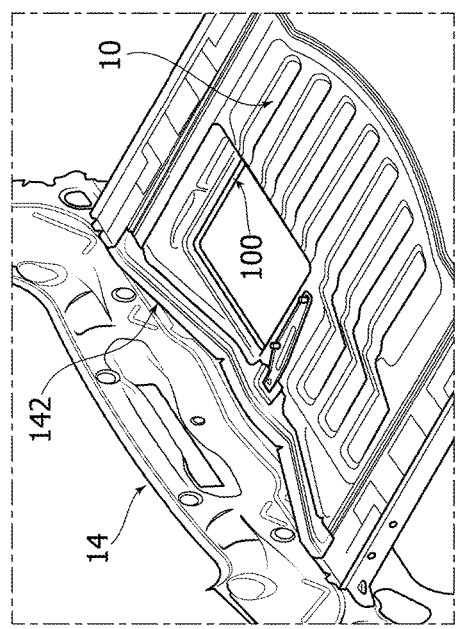
Figure 11:
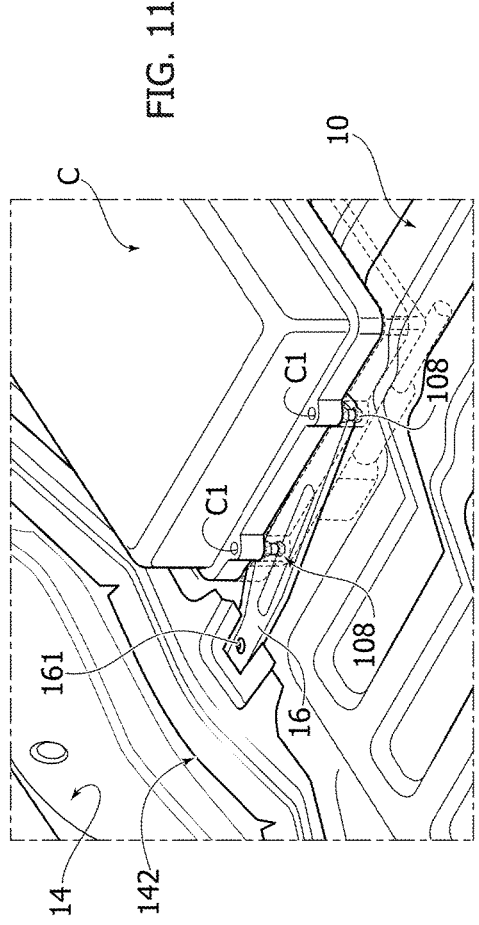

Further features and advantages of the invention will become apparent from the following description with reference to the annexed drawings, given purely by way of non limiting example, in which:

FIG. 1 is a perspective view in cross-section which shows a spare wheel received and clamped within the housing space defined by a motor-vehicle structure according to a first embodiment of the present invention, FIG. 2 is a perspective exploded view of the unit of FIG. 1, FIGS. 3, 4 are two further perspective views of the structure of FIGS. 1, 2, FIGS. 5-8 are perspective views at an enlarged scale of some details of the structure of FIGS. 1-4, FIG. 9 is a perspective view of a second embodiment of the motor-vehicle structure according to the invention, FIG. 10 shows a perspective view of the structure of FIG. 9 with an electric or electronic component (such as an electronic control unit or a component for accumulating electric energy) housed thereon, and FIG. 11 shows a detail of FIG. 10 at an enlarged scale.

With reference initially to FIGS. 1, 2, a spare wheel R is shown which is housed within a housing space defined by a floor portion 10 forming part of a motor-vehicle structure.

The floor portion 10 has a main body made of plastic material or composite material including a polymeric matrix reinforced with glass fibres or carbon fibres. Body 10 is obtained for example by means of a hot compression moulding process. In any case, the choice of the plastic material constituting the floor portion 10 and the choice of the technology for producing the same may widely vary according to the circumstances, on the basis of criteria which are clearly evident to the skilled men in the art. These details have been omitted from the present description, both because they can be made in any known way, and because they do not fall, taken alone, within the scope of the present invention.

In the illustrated example, the main body of the floor portion 10 is shaped with a bottom wall 101 which is located at a lowered level with respect to a peripheral portion which comprises two longitudinal side edges 102, a rear transverse edge 103 (with reference to the direction of advancement of the vehicle) and a front transverse edge 104.

According to a technique known per se, the floor portion 10 is received within an aperture 12 (FIG. 2) of an underbody portion 14 forming part of the motor-vehicle body. More precisely, in the case of the illustrated example, aperture 12 is defined between two longitudinal beams 120, a rear transverse structure 122 and an underbody central portion 124. The peripheral edges 102, 103, 104 of the floor portion 10 are supported by corresponding surfaces of the underbody portion 14 along the edges of aperture 12 and are rigidly connected thereto by connecting means of any type, such as by screws (not shown).

With reference again to FIG. 1, in the case of the specific illustrated example, on the body of plastic material of floor portion 10 there is moulded a superstructure of plastic material 106 which is formed simultaneously with the main body of portion 10 during the above mentioned operation of hot-compression moulding. The superstructure of plastic material 106 extends through a central area of portion 10 (see FIG. 2) from the centre towards the two sides of the bottom wall 101, as well as from the centre towards the rear side 103 and towards the front side of structure 10. These details of construction are provided herein purely by way of example, since the invention is of general application and can be extended to any type of structure for the floor portion 10.

According to the present invention, to the floor portion 10 there is associated a holding element 16, for holding the spare wheel R. In the illustrated example, the holding element 16 is constituted by a strip of sheet-metal having one end rigidly connected to the motor-vehicle body and an opposite end carrying an element for anchoring the spare wheel, according to what will be described more in detail in the following.

With reference in particular to FIGS. 1 and 5-8, the strip of sheet-metal 16 has one end having a hole 160 for engagement of a snap-in fixing stud 161, which anchors strip 16, not only to the floor portion 10, but also to a metal flange 142 projecting from the rear-cross member 122 forming part of body 14. In place of stud 161 it is possible to use one or more connecting elements of any type, such as screws or rivets. One end of the holding element 16 is therefore rigidly connected to the motor-vehicle structure.

Figure 5:
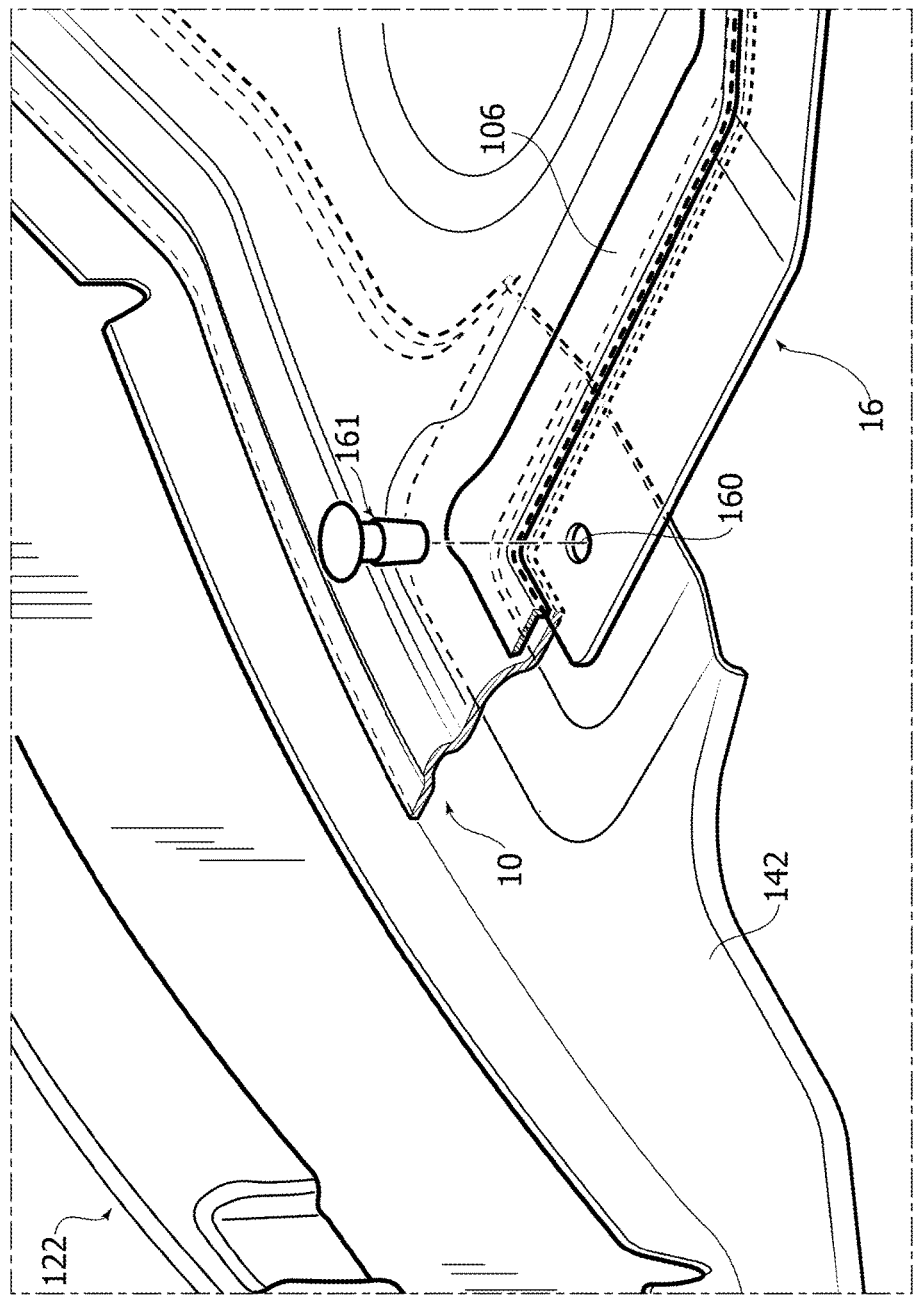
Figure 8:
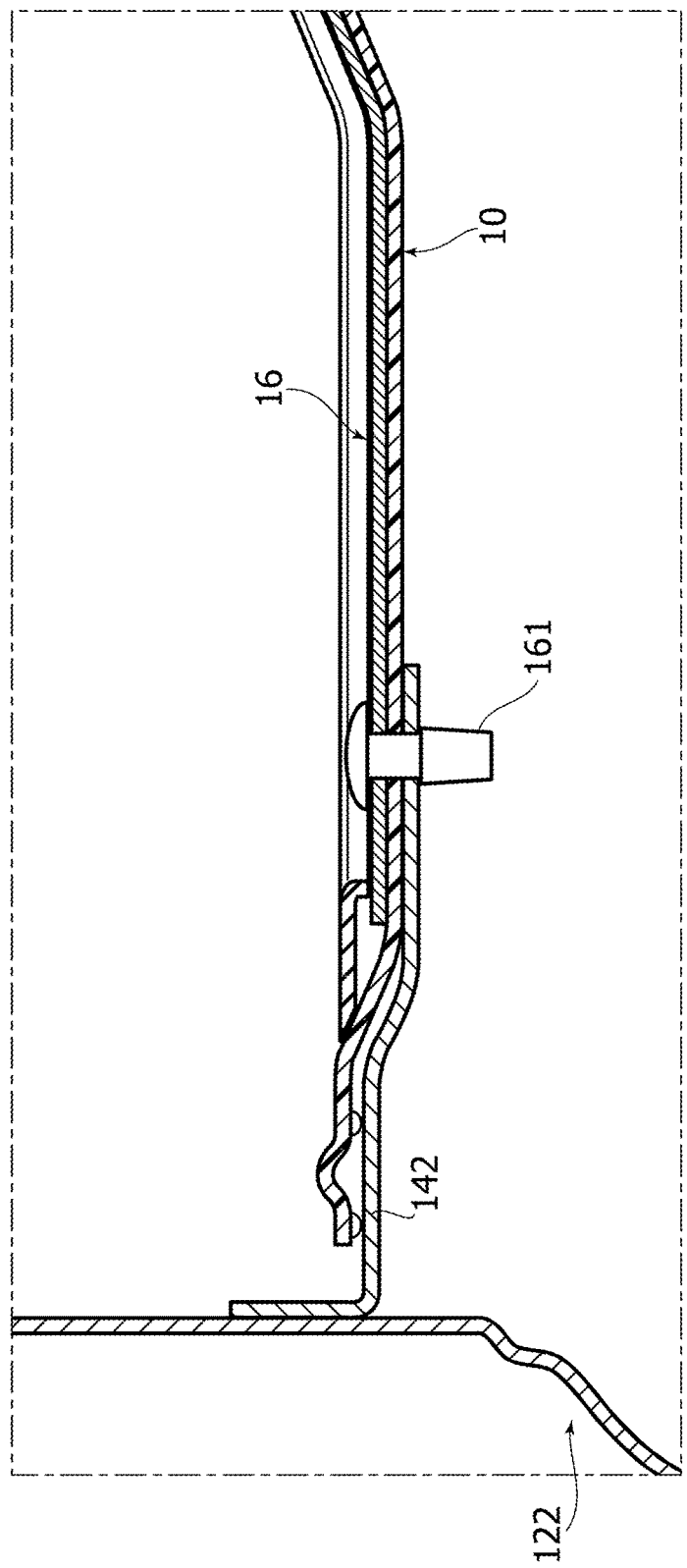

Strip 16 is partially embedded along its lateral edges, as shown in FIG. 5, between the main body of the floor portion 10 and the superstructure 106 and it has one end, opposite to that provided with hole 160, which is located in proximity of the centre of the floor portion 10. To this front end (with reference to the direction of advancement of the motor-vehicle) of the holding element 16 there is rigidly connected an anchoring member 18 for anchoring the spare wheel R.

In the illustrated example, this anchoring member is constituted by a metal bush 18, with an inner thread, which is embedded within the body of plastic material of super-structure 106 and is welded to strip 16. As shown in FIGS. 1 and 6, 7, within bush 108 there is screwed a screw 20 provided with a head having a knob of plastic material 22 which rests against the front surface of the hub of wheel R, so that, in the tightened condition of screw 20 within bush 18, wheel R is clamped within the housing space defined by the floor portion 10, against the bottom wall 101.

As it will become apparent from the foregoing, in the clamped condition of wheel R, the latter is secured to the anchoring member 18, which on its turn is rigidly connected to one end of the holding element 16. The opposite end of the holding element 16 is rigidly connected not only to the floor portion 10 of plastic material or composite material, but also directly to the motor-vehicle structure.

As a result of this arrangement, if, as a result of an accident, in particular due to a strong rear impact, the spare wheel R becomes separated from the floor portion 10, for example because the latter is broken, the hub of the wheel remains anyway securely anchored to member 18 and therefore securely anchored to the motor-vehicle body through member 18 and holding element 16. The holding element prevents that the spare wheel is projected far away from the underbody structure, by constraining it to remain within a distance corresponding to the length of holding element 16.

FIGS. 9-11 relate to a second embodiment of the structure of the invention, applied to the case in which on the floor portion 10 of plastic material or composite material a component is carried, different from a spare wheel, in the specific case an electronic control unit C which is for controlling apparatus on board of the motor-vehicle. The floor portion 10 can carry one or more components of this type, such as one or more electric or electronic components or a so-called ESS unit (Energy Storage System) for accumulating electric energy. Component C may be constituted by a unit for sealing and inflating a punctured tire, to be provided on board of the motor-vehicle in place of the spare wheel. Whatever is the nature and the function of the said one or more components C carried on the floor portion 10 of plastic material or composite material, to each of said components, or to some of said components it is provided that one holding element 16 is associated, which is functionally similar to that described above with reference to the spare wheel R.

FIGS. 9-11 show by way of example the case of a single component C which is received and supported within the edges of an aperture 100 of the floor portion 10. In these figures, parts corresponding to those of FIGS. 1-8 are indicated by the same reference numerals.

As shown more in detail in FIG. 11, the holding element 16 is constituted by a sheet-metal plate having a substantially elongated shape. Plate 16 has one end anchored by a snap-in stud 161 both to the wall of the floor portion 10 and to a cross-member of sheet-metal welded to, and forming part of the underbody portion 14, this cross-member being superimposed to the rear edge of the floor portion 10.

The holding element 16 has both its end opposite to stud 161, and an intermediate portion thereof secured to the housing of component C. To this end, this housing has a peripheral edge with lugs C1 having holes within which there are engaged bolts 108 which engage also corresponding holes of plate 16.

In case of an impact, plate 16 holds the structure of component C connected to the motor-vehicle body. Therefore, also in the case that the floor portion 10 of plastic material becomes broken, component C cannot be projected far away from the vehicle, but it is instead constrained to remain within a distance corresponding to the longitudinal dimension of the holding plate 16. This arrangement, as already indicated, can be adopted for one or more different components C carried on the floor portion 10.

As shown, in both the above described embodiments, the holding element 16 is a plate of elongated shape oriented in the longitudinal direction of the motor-vehicle and having one front end, with reference to the direction of advancement of the motor-vehicle, adjacent to a central area of the floor portion and adapted to be anchored to said spare wheel R or said other component C, and a rear end anchored to a rear cross-member 142 forming part of the underbody portion 14.

It is possible to provide a single holding element connected to more than one component and/or to said spare wheel or also more holding elements each connected to one or more components and/or to said spare wheel.

Naturally, while the principle of the invention remains the same, the details of construction and the embodiments may widely vary with respect to what has been described and illustrated purely by way of example, without departing from the scope of the present invention.

The invention claimed is:

1. A motor-vehicle structure, including:

an underbody portion of sheet-metal defining an aperture and a floor portion of plastic material or composite material for housing a spare wheel of a vehicle, said floor portion mounted within said aperture;

a holding element associated to said floor portion of plastic material or composite material, said holding element anchored to an underbody portion of sheet-metal and connected to a mounting member connectable to said spare wheel;

said holding element being an elongated plate, having a longitudinal dimension oriented in a longitudinal direction of the motor-vehicle and having a front end, located closest to a front end of the motor-vehicle with reference to the direction of advancement of the motor-vehicle, adjacent to a central area of said floor portion and connected to said mounting member connectable to said spare wheel and a rear end located closest to a rear end of the motor vehicle opposite the direction of advancement, said rear end anchored to a rear cross-member of said underbody portion; and said holding element configured to prevent said spare wheel from being projected far away from the underbody structure in a case of an accident, by constraining said spare wheel to remain within a distance corresponding to the longitudinal dimension of said holding element.

2. The motor-vehicle structure according to claim 1, wherein said holding element is made of any material chosen among sheet-metal, plastic material and/or composite material and has one end anchored to the motor-vehicle structure by a connecting element which engages the motor-vehicle structure and an opposite end which can be anchored to the spare wheel by at least one connecting member.

3. The motor-vehicle structure according to claim 1, further comprising an electronic control unit and/or an energy storage device on said floor portion and one or more additional holding elements connected to said electronic control unit and/or energy storage device.

4. The motor-vehicle structure according to claim 2, further comprising an electronic control unit and/or an energy storage device wherein on said floor portion and one or more holding elements additional holding elements connected to said electronic control unit and/or energy storage device.

5. The motor-vehicle structure according to claim 1, wherein said holder is partially embedded in a bottom portion of said floor portion.

* * * * *